3,027,404
(dl)THREO-2-(2,2-DICHLOROACETAMIDO)-1-(p-SULFAMOYLPHENYL) - 1,3 - PROPANEDIOL ESTERS

Edward C. Hermann, Newark, Del., assignor to E. I. du Pont de Nemours and Company, Wilmington, Del., a corporation of Delaware
No Drawing. Filed Mar. 2, 1960, Ser. No. 12,258
5 Claims. (Cl. 260—490)

This invention relates to the new compounds (dl)-threo-2 - (2,2 - dichloroacetamido) - 1 - (p - sulfamoylphenyl)-1,3-propanediol, 3-acetate, and (dl)-threo-2-(2,2-dichloroacetamido) - 1 - (p - sulfamoylphenyl) - 1,3 - propanediol, 3-propionate, and their optically active D(—)-threo isomers, and to their preparation.

The novel compounds of this invention, identified above, are prepared by reacting in a suitable medium the known compound (dl)-threo-2-(2,2-dichloroacetamido)-1-(p-sulfamoylphenyl)-1,3-propanediol, or alternatively its D(—)-threo isomer, with a suitable compound capable of furnishing an acetate radical, or alternatively a propionate radical, in the presence optionally of an acid acceptor.

Formerly, the principal starting compound was called (dl) - threo - 1 - (p - sulfamylphenyl) - 2 - (alpha,alpha-dichloroacetamido)-1,3-propanediol. Preparation of this compound is disclosed in Gregory U.S. Patent 2,680,135, issued June 1, 1954.

In the preparation of the compounds of this invention, as stated above, any suitable source of acetate or propionate radical can be used, as will be readily understood. Particularly preferred compounds include acetic acid, acetic anhydride, acetyl halides such as acetyl chloride and acetyl bromide, acetyl cyanide and ketene; or alternatively propionic acid, propionic anhydride, propionyl chloride, propionyl bromide, methyl ketene, propionyl cyanide and thiopropionic acid.

Suitable media useful in the preparation of these compounds include dimethyl formamide, triethylamine, trimethylamine, pyridine and mixtures of these. Alkali metal hydroxides, alkali metal carbonates, alkali metal bicarbonates, and the like, can be also used in aqueous or non-aqueous solvents. The preferred medium for the reaction is dimethyl formamide, with or without an acid acceptor such as pyridine.

The temperature at which the process can be carried out is not particularly critical. A range of about 0° to about 200° C. is satisfactory. When using dimethyl formamide, a temperature from about 10° to about 50° is especially advantageous.

Equimolar amounts of the reactants are satisfactory but of course some excess of either principal reactant can be used. When the reaction medium is a neutral material, such as dimethyl formamide, in working up the reaction, it is helpful to neutralize the liberated acid with any suitable base, such as sodium hydroxide, before proceeding with the isolation.

The final product can be recovered from the reaction medium by any suitable method, such as by concentration under reduced pressure, or by dilution with water in which case the product can be separated by filtration or by extraction with a suitable agent such as ethyl acetate, N-butyl alcohol, nitromethane, or the like, followed by evaporation of the solvent.

The reactants can be introduced into the process in either order or simultaneously.

The compounds of this invention are useful as pharmaceutical agents and show particular activity against bacterial and rickettsial infections, including for example pneumococcal pneumonia. The compounds, each alone, together or with other active ingredients, can be combined with solid or liquid pharmaceutical carriers and formulated into the form of tablets, powder packets or capsules, or dissolved in suitable solvents for oral or parenteral administration.

These compounds are also useful as animal feed supplements and can be incorporated into the diet of poultry and livestock directly or along with other supplements, such as vitamins, minerals, antibiotics, etc.

The compounds of this invention have been discovered to be outstanding and unexpectedly unique among known related compounds in having an extremely high absorption rate in the system of the recipient upon oral administration. For example, it has been demonstrated that the absorption characteristics are surprisingly more than 150% and even 200% those of the closed related prior art compound.

This invention will be better understood but is not intended to be limited by the following illustrative examples:

EXAMPLE 1

*Preparation of (dl)-Threo-2-(2,2-Dichloroacetamido)-1-(p-Sulfamoylphenyl)-1,3-Propanediol, 3-Propionate*

A solution of 71.4 grams of (dl)-threo-2-(2,2-dichloroacetamido)-1-(p-sulfamoylphenyl)-1,3-propanediol in 150 cc. of dimethyl formamide is stirred as 20 grams of propionyl chloride is added dropwise. The temperature rises and is kept between 30° to 35° C. After the addition is complete, the mixture is allowed to stand for one hour, then poured into 1.5 liters of ice and water, and the pH adjusted to 6 by adding concentrated ammonium hydroxide. The water is extracted with ethyl acetate five times and the combined extracts dried over anhydrous magnesium sulfate. The ethyl acetate solution is then filtered and concentrated under reduced pressure. The remaining residue is dissolved in 300 cc. of hot 1,2-dichloroethane. On cooling and stirring, the product separates as crystals. The product can be recrystallized from nitromethane and melts at 149–150° C.

*Analysis.*—Calcd. for $C_{14}H_{18}N_2O_6S$: Cl, 17.15; S, 7.76. Found: Cl, 16.92; S, 7.87.

EXAMPLE 2

*Preparation of D(—)-Threo-2-(2,2-Dichloroacetamido)-1-(p-Sulfamoylphenyl)-1,3-Propanediol, 3-Propionate*

A solution of 10.7 grams of D(—)-threo-2(2,2-dichloroacetamido) - 1 - (p - sulfamoylphenyl) - 1,3 - propanediol in 12 ml. of dimethyl formamide and 2.7 ml. of pyridine is stirred as 3 grams of propionyl chloride is added dropwise. The temperature rises and is kept between 25° and 30° C. After the addition is complete, the reaction mixture is stirred at room temperature for two hours. It is then poured into 200 ml. of water. The D(—) - threo - 2 - (2,2 - dichloroacetamido) - 1 - (p-sulfamoylphenyl-1,3-propanediol, 3-propionate crystallizes out. It is allowed to stand for a few hours, then filtered off, and washed with water.

The crude products melts at 160–162° C. and weighs 9.5 grams which amounts to a 74% yield. It can be easily recrystallized from nitromethane, water, ethyl acetate and from mixtures of alcohol and water. The pure compound melts at 163–163.5° C.

EXAMPLE 3

*Preparation of (dl)-Threo-2-(2,2-Dichloroacetamido)-1-(p-Sulfamoylphenyl)-1,3-propanediol, 3-acetate*

A solution of 35.7 grams of (dl)-threo-2-(2,2-dichloroacetamido) - 1 - (p - sulfamoylphenyl) - 1,3 - propanediol in 100 cc. of dimethyl formamide is stirred at room temperature as 8 grams of acetyl chloride is added. The temperature is kept below 40° C. The mixture is allowed to stand for one hour, then poured into 1 liter of ice and water. The pH of the solution is then brought to 7 by adding base. The product can be extracted from the water with ethyl acetate. The ethyl acetate is removed by distillation and the product is crystallized by stirring the residue with methylene chloride. The product can be recrystallized from water. It is a white solid melting 120–121.5° C.

*Analysis.*—Calcd. for $C_{13}H_{16}Cl_2N_2O_6S$: Cl, 17.76; S, 8.03. Found: Cl, 17.51; S, 7.85.

The invention claimed is:

1. A compound selected from the group consisting of (dl) - threo - 2 - (2,2 - dichloroacetamido) - 1 - (p - sulfamoylphenyl)-1,3-propanediol, 3-acetate; (dl)-threo-2-(2,2 - dichloroacetamido) - 1 - (p - sulfamoylphenyl)- 1,3-propanediol, 3-propionate; and their D(—)-threo isomers.

2. (dl) - Threo - 2 - (2,2 - dichloroacetamido) - 1- p-sulfamoylphenyl)-1,3-propanediol, 3-acetate.

3. D(—) - threo - 2 - (2,2 - dichloroacetamido) - 1- (p-sulfamoylphenyl)-1,3-propanediol, 3-acetate.

4. (dl) - Threo - 2 - (2,2 - dichloroacetamido) - 1- (p-sulfamoylphenyl)-1,3-propanediol, 3-propionate.

5. D(—) - threo - 2 - (2,2 - dichloroacetamido) - 1- (p-sulfamoylphenyl)-1,3-propanediol, 3-propionate.

References Cited in the file of this patent

UNITED STATES PATENTS

| | | |
|---|---|---|
| 2,538,765 | Crooks et al. | Jan. 23, 1951 |
| 2,680,135 | Gregory | June 1, 1954 |
| 2,831,854 | Tucker | Apr. 22, 1958 |

FOREIGN PATENTS

| | | |
|---|---|---|
| 701,997 | Great Britain | Jan. 6, 1954 |